Sept. 27, 1966 J. R. COLSTON 3,275,013

HIGH GAIN PURE FLUID AMPLIFIER

Filed Aug. 13, 1963

INVENTOR
JOHN R. COLSTON

BY Hurvitz + Rose

ATTORNEYS

United States Patent Office 3,275,013
Patented Sept. 27, 1966

3,275,013
HIGH GAIN PURE FLUID AMPLIFIER

John R. Colston, Silver Spring, Md., assignor to Bowles Engineering Corporation, Silver Spring, Md., a corporation of Maryland Filed Aug. 13, 1963, Ser. No. 301,743
8 Claims. (Cl. 137—81.5)

Figure 1:
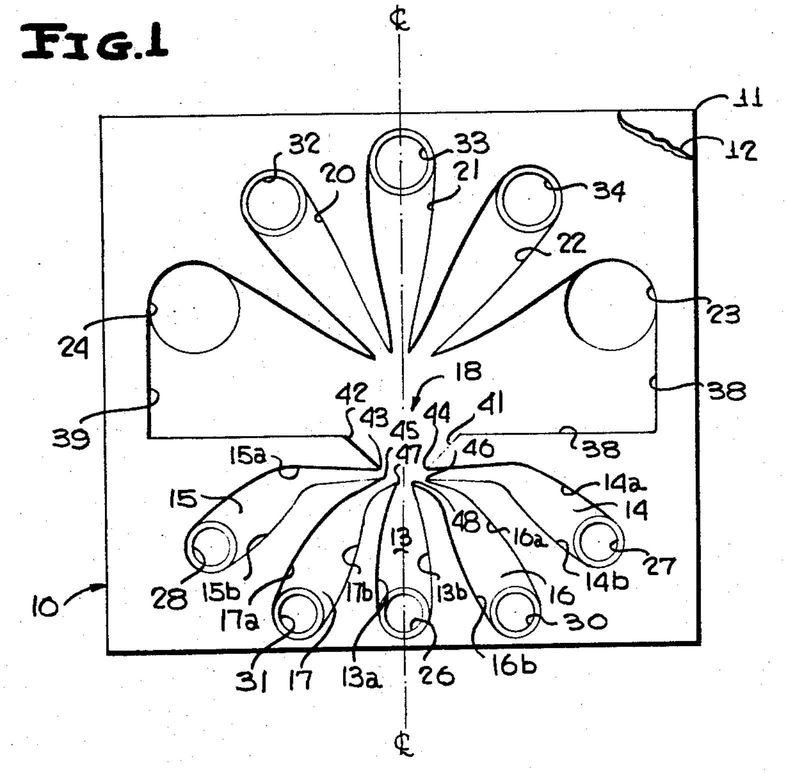

This invention relates generally to pure fluid amplifying systems and, more specifically, to a pure fluid amplifier capable of providing a high gain output.

It was discovered recently that a fluid-operated system having no moving parts could be constructed so as to provide a fluid amplifier in which the proportion of the total energy pressure or mass flow of a fluid stream delivered to an output orifice or utilization device is controlled by a further fluid stream of lesser total energy pressure or mass flow. These systems are generally referred to as "pure fluid amplifiers," since no moving mechanical parts are required for their operation.

A typical pure fluid amplifier may comprise a main fluid nozzle extending through an end wall of an interaction region defined by a sandwich-type structure consisting of an upper plate and a lower plate which serve to confine fluid flow to a planar flow pattern between the two plates, two side walls (hereinafter referred to as the left and right side walls), and one or more dividers disposed at a predeterminned distance or distances from the end wall. The leading edges or surfaces of the dividers are disposed relative to the main fluid nozzle centerline so as to define separate areas in a target plane. The side walls of the dividers in conjunction with the interaction region side walls establish the receiving apertures which are entrances to the amplifier output channels. Completing the description of the apparatus, left and right control orifices may extend through the left and right side walls respectively. In the complete unit, the region bounded by top and bottom plates, side walls, the end wall, receiving apertures, dividers, control orifices and a main fluid nozzle, is termed as "interaction chamber region,"

Two broad classes of pure fluid amplifiers are—(I) Stream interaction or momentum exchange and (II) Boundary layer control. The instant invention is related only to Class I or momentum exchange type of the pure fluid amplifiers in which there is one or more relatively low magnitude streams hereinafter referred to as a control stream, deflects another and considerably higher magnitude stream, hereinafter referred to as the power stream, with little or no interaction between the side walls of the interaction region and the interacting streams themselves. Power stream deflection in such a unit is continuously variable in accordance with control signal amplitude. Such a unit is referred to as a continuously variable amplifier or computer element. In an amplifier or computer element of this type, the detailed contours of the side walls of the interaction chamber are of secondary importance to the interacting forces between the streams themselves. Although the side walls of such units can be used to contain fluid in the interacting chamber, and thus make it possible to have the control and power streams interact in a region at some desired ambient pressure, the side walls are so placed that they are somewhat remote from the high velocity portions of the interacting streams and the power stream does not approach or attach to the side walls. Under these conditions the power stream flow pattern within the interacting chamber depends primarily upon the size, speed and direction of the power stream and control streams and upon the density, viscosity, compressibility and other properties of the fluids in these streams.

Pure fluid amplifying systems are usually constructed of two or three flat plates sandwiched together and held in a fluid-tight relationship by machine screws, clamps, adhesives or any other suitable means. If only two flat plates are used, the passages, cavities and orifices needed to form the fluid amplifier component are created in one plate by etching, molding, milling, casting or other conventional techniques, and the other plate is sealed to the one plate to cover these passages, cavities and orifices. When the sandwich type structure comprises three plates, the center plate usually is cut out or shaped by other means to provide the desired configuration of the fluid amplifier component and the remaining two plates provide upper and lower covering plates for sandwiching the center plate therebetween.

In pure fluid amplifiers of the stream interaction type in which pressure is the desired parameter output of the amplifier, changes in output pressure; that is, changes in pressure of the fluid in the output passages of the amplifier is proportional to the momentum of interaction between the control streams and the power stream. The gain of a pure fluid amplifier is equal to change in output pressure divided by the change in pressure of the control stream or streams needed to produce the corresponding change in output pressure. As will be apparent to those working in the art, it is generally desirable that the pure fluid amplifier maximize pressure gain so that relatively low differentials in control stream pressures will produce relatively large changes of pressures in the output passages.

Broadly, it is an object of this invention to provide a stream interaction type of pure fluid amplifier having a gain higher than existing pure fluid amplifiers of this type.

Another object of this invention is to provide a high gain pure fluid amplifier of the stream interaction type which may be constructed by slightly modifying a lower gain conventional pure fluid amplifier of the stream interaction type.

According to this invention, a pure fluid amplifier of the stream interaction type including a power nozzle and at least one control nozzle, is modified by the provision of a fluid vent passage formed intermediate the control and power nozzles, the vent passage venting fluid received to an environment at preferably ambient pressure. The entrance to the vent passage terminates adjacent the orifices of the control and power nozzles so that the passage receives a predetermined portion of the fluid from the control nozzle. The resulting system provides a pressure gain considerably greater than that produced by existing pure fluid amplifiers of the stream interaction type.

Figure 2:
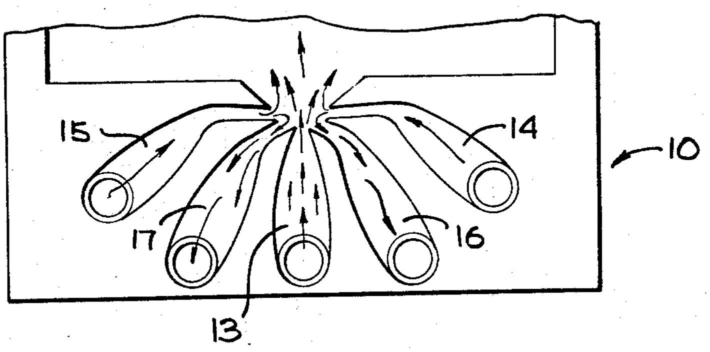

The above and still further objects, features and advantages of the present invention will become apparent upon consideration of the following detailed description of one specific embodiment thereof, especially when taken in conjunction with the accompanying drawings, wherein:

FIGURE 1 illustrates a plan view of a pure fluid amplifier in accordance with the present invention; and FIGURE 2 is a partial plan view of FIGURE 1, showing the directions of flow of fluid from a control nozzle into a vent passage.

Referring now to FIGURE 1 of the accompanying drawing for a more complete understanding of this invention, there is shown a pure fluid amplifier 10 of the stream interaction or analog type, as previously described. The cavities, passages and nozzles needed to provide the pure fluid amplifier 10 are formed in a flat plate 11 and plate 11 is covered by a flat plate 12, the two plates being sealed in fluid tight sandwich relationship, one to the other, by means and methods described generally hereinabove. For the purposes of clarity, the plates 11 and 12 are shown to be composed of a clear plastic material, however it should be understood that any material compatible with the working fluid may be used in the construction of the amplifier.

The amplifier 10 comprises a power nozzle 13, a pair of substantially opposed control nozzles 14 and 15, a pair of venting passages 16 and 17, an interaction chamber or region 18, output passages 20, 21 and 22, and openings 23 and 24 in the downstream end of the chamber 18. The plates 11 and 12 may be bored and internally threaded so that the threaded ends of tubes 26, 27, 28, 30, 31, 32, 33 and 34 inclusive, may be threadedly connected into threaded holes in the plates 11 and 12 to receive and supply fluid to the nozzle and output passages. The tubes 26, 27, 28 supply fluid to the amplifier 10 and the tubes 30, 31, 32, 33 and 34 receive fluid from the amplifier 10. The tubes 30 and 31 receive fluid from the venting passages 16 and 17, respectively and discharge fluid so received into a sump (not shown) or to an environment preferably at ambient pressure. The openings 23 and 24 are bored through the plate 11 and discharge fluid in the chamber 18 which flows into those openings to an environment at ambient pressure or to a sump (not shown). The various passages, cavities and nozzles forming the amplifier 10 may be positioned symmetrically or assymmetrically with respect to a centerline CL taken through the passage 21 and the power nozzle 13 and are shown to be located symmetrically with respect to that centerline.

The chamber 18 is formed with a pair of opposed side walls 38 and 39 for confining planar flow in the chamber, the sidewalls 38 and 39 including sidewall sections 41 and 42, respectively, converging toward the orifice of the power nozzle 13. Apices 43 and 44 are formed by the intersection between the sidewall sections 41 and 42 and one sidewall **14*a* and 15*a*, respectively, of each control nozzle 14 and 15, respectively, as illustrated. The opposed nozzle sidewalls 14*b* and 15*b* of the control nozzles 14 and 15, respectively, intersect at apices 45 and 46 with the sidewalls 16*a* and 17*a*, respectively, of the venting passages 16 and 17, respectively. The opposite sidewalls 16*b* and 17*b* of the venting passages 16 and 17, respectively, intersect with the sidewalls 13*a* and 13*b*, respectively of the power nozzle 13 at apices 47 and 48, respectively. The apices 47 and 48 and the apices 45 and 46** are essentially in horizontal alignment, as viewed in the accompanying drawing.

The downstream openings or apertures of the output passages 20, 21 and 22 are positioned such that in the absence of control stream flow from either of the control nozzles 14 or 15, the power stream issuing from the power nozzle 13 will be directed toward the output passage 21. Ordinarily, the output passage 21 delivers fluid received from the power stream into a sump (not shown) or into a region at ambient pressure. Thus the fluid outputs from the tubes 32 and 34 are typically utilized to control or operate other types of devices, of a fluid type or otherwise, to which these output tubes are connected.

Because of power stream diffusion in the interaction chamber portions of the power stream are also received by the output passages 20 and 22, the amount of flow into the passages 20 and 22 and the pressure recovered in these passages depending upon the backloading or the restriction to flow downstream of the output passages. As will be evident, increasing the restriction to flow from the output passages 20 and 22 decreases the amount of flow and pressure that will be received from the power stream. The differentials in fluid pressures of fluid in the tubes 32 and 34 will be dependent upon the quantity of fluid received by the passages 20 and 22, and the quantity of fluid directed toward the entrance of each output passage is dependent upon the momentum of interaction between the control streams and the power stream, the pressure differentials between the output tubes 32 and 34 will be a function of the differentials in the control stream pressures. If the control nozzles 14 and 15 are issuing fluid streams simultaneously, the displacement of the power stream relative to the entrances of the output passages will be determined by the relative differences in pressure between the opposed control streams, assuming a symmetrical amplifier.

FIGURE 2 of the drawing illustrates typical flow patterns in the control and power nozzles and in the venting passages resulting when the control nozzles 14 and 15 are each issuing control stream for effecting displacement of the power stream. As indicated by the flow arrows in this figure, portions of each control stream interact to directly effect displacement of the power stream and the remaining portions of control stream fluid bend and flow over and around the apices 45 and 46 into the orifices of the venting passages 16 and 17, respectively. It has been discovered and observed experimentally that by providing the venting passages 16 and 17 in the amplifier 10 and permitting a portion of the control stream flow to flow into, and vent freely from these passages, while the remaining portions of the control streams interact with the power stream and flow along with the power stream, the pressure gain of the amplifier 10 increase considerably.

For example, the amplifier 10 illustrated in FIGURE 1 will typically have a pressure gain of between 50 to 100 percent greater than the pressure gain which would be typically obtainable from a pure fluid amplifier of identical shape and configuration, but without the venting passages 16 and 17. Although this phenomenon has been proven by experimental tests the exact reason as to why a high pressure gain is produced by venting the amplifier 10 as disclosed is presently not known to those skilled in the art.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A pure fluid amplifier comprising a power nozzle having an orifice for issuing a constricted power stream therefrom, a chamber positioned downstream of said power nozzle for receiving the power stream, output means positioned downstream of said chamber for receiving fluid therefrom, a control nozzle having an orifice for issuing a control stream in interacting relationship with the power stream so as to effect displacement thereof relative to said output means, and means positioned between the orifice of said power nozzle and the orifice of said control nozzle for venting a portion of the control flow to a region external to said pure fluid amplifier.

2. The pure fluid amplifier as claimed in claim 1 wherein said means positioned between the orifice of said power nozzle and the orifice of said control nozzle comprises a passage for venting fluid to an ambient pressure.

3. A pure fluid amplifier comprising a power nozzle having an orifice for issuing a constricted power stream therefrom, a chamber located downstream of said power nozzle for receiving the power stream, plural output passages communicating with the downstream end of said chamber for receiving quantities of the power stream issuing from said power nozzle, a pair of substantially opposed control nozzles having orifices for issuing control streams in interacting relationship with the power stream for displacing the power stream relative to said output passages, at least one passage having an entrance located proximate the upstream end of the area of contact between said streams for receiving a quantity of the control flow from said one of said control nozzles, and means provided at the end of said passage remote from said entrance for discharging fluid received to an ambient pressure environment.

4. The pure fluid amplifier as claimed in claim 3 wherein a pair of passages are provided having the entrances thereto located between the orifices of said control nozzles and said power nozzle, each passage receiving a quantity of control stream flow and venting flow so received to an ambient pressure environment.

5. The pure fluid amplifier as claimed in claim 4 wherein further means are provided for confining power stream flow in said chamber to its plane of deflection by said control stream.

6. The pure fluid amplifier as claimed in claim 4 comprising a pair of passages, each passage having an entrance located intermediate the orifice of a different control orifice and said power nozzle so as to receive a portion of control flow directed against the power stream.

7. A pure fluid amplifier comprising a power nozzle having an orifice for issuing a constricted power stream therefrom, a chamber positioned downstream of said power nozzle for receiving the power stream, said chamber including a pair of sidewalls for confining power stream flow in directions transverse to the direction of power stream flow, plural output passages symmetrically located with respect to said power nozzle and positioned downstream of said chamber so as to receive power stream flow therefrom, at least one control nozzle angularly disposed with respect to said power nozzle having an orifice for issuing control streams in interacting relationships with the power stream for effecting displacement of the power stream relative to said output passages, and means located between the orifices of said nozzle and said power nozzle for venting a portion of the control stream flow to an ambient pressure environment external to said amplifier.

8. A pure fluid amplifier comprising a power nozzle having an orifice for issuing a constricted power stream therefrom, a chamber positioned downstream of said power nozzle for receiving the power stream, said chamber including a pair of sidewalls for confining power stream flow, in directions transverse to the direction of power stream flow, plural output passages symmetrically located with respect to said power nozzle and positioned downstream of said chamber so as to receive power stream flow therefrom, at least one control nozzle angularly disposed with respect to said power nozzle having an orifice for issuing control streams in interacting relationships with the power stream for effecting displacement of the power stream relative to said output passages, an orifice located in a region proximate the upstream end of the area of contact between said streams for receiving fluid flow from said region and means venting said orifice to an ambient pressure region external to said pure fluid amplifier.

References Cited by the Examiner

UNITED STATES PATENTS

| | | | |
|---|---|---|---|
| 3,016,063 | 1/1962 | Hausmann | 137—81.5 |
| 3,098,504 | 7/1963 | Joesting. | |
| 3,107,850 | 10/1963 | Warren et al. | 137—81.5 X |

M. CARY NELSON, *Primary Examiner.*

S. SCOTT, *Assistant Examiner.*